(12) United States Patent
Yamazaki

(10) Patent No.: US 7,940,488 B2
(45) Date of Patent: May 10, 2011

(54) STORAGE DEVICE AND GAIN ADJUSTING DEVICE

(75) Inventor: Akihiro Yamazaki, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 213 days.

(21) Appl. No.: 12/345,274

(22) Filed: Dec. 29, 2008

(65) Prior Publication Data

US 2009/0268332 A1     Oct. 29, 2009

(30) Foreign Application Priority Data

Apr. 25, 2008 (JP) ................................. 2008-116047

(51) Int. Cl.
    *G11B 5/02*     (2006.01)
    *G11B 5/596*    (2006.01)

(52) U.S. Cl. ........................................ 360/67; 360/77.04

(58) Field of Classification Search .................. None
    See application file for complete search history.

(56) References Cited

U.S. PATENT DOCUMENTS 7,154,688 B2 * 12/2006 Oshimi et al. .................. 360/48

FOREIGN PATENT DOCUMENTS

JP          A 7-192238       7/1995

* cited by examiner

*Primary Examiner* — Daniell L Negrón
*Assistant Examiner* — Regina N Holder
(74) *Attorney, Agent, or Firm* — Greer, Burns & Crain Ltd.

(57) ABSTRACT

An amplifier amplifies, according to a first gain value, a first input signal acquired by reproducing first information from first areas having the first information recorded therein area by area in order. The amplifier also amplifies, according to a second gain value, a second input signal acquired by reproducing second information pursuant to reproduction of the first information, from a second area adjacent to the first area and that has the second information recorded at a recording level different from that of the first information. When the first input signal is amplified, a first gain value following a change in the first signal is calculated so that the level of the amplified signal becomes constant. When the second input signal is amplified, a second gain value following a change in the first gain value is calculated so that the level of the amplified signal becomes constant.

2 Claims, 8 Drawing Sheets

STORAGE DEVICE AND GAIN ADJUSTING DEVICE

CROSS-REFERENCE TO RELATED APPLICATIONS

This application is based upon and claims the benefit of priority of the prior Japanese Patent Application No. 2008-116047, filed on Apr. 25, 2008, the entire contents of which are incorporated herein by reference.

BACKGROUND

1. Field

The present invention relates to a storage device and a gain adjusting device that adjust a gain of an amplifier.

2. Description of the Related Art

In recent years, recording and reproducing a signal has been getting more difficult as the record density and data transfer speed of a storage device, such as a magnetic disc device, has been getting higher. Higher record density has lead to a demand for the higher track density (TPI: Tracks Per Inch) of a storage medium (magnetic disc) in its radial direction.

For this reason, such a Storage device carries out auto gain control (hereinafter "AGC") on a reproduced signal read by a magnetic head when reading data out of a magnetic disc serving as a storage medium (see, e.g., Japanese Patent Application Laid-open No. 07-192238). AGC is carried out to control a gain of an amplifier amplifying a reproduced signal to keep the amplitude of the amplified signal constant.

A schematic description will be made of gain adjustment by conventional AGC, referring to FIG. 9. FIG. 9 is a timing chart for explaining response waveforms generated by conventional AGC. In FIG. 9, "SGATE" represents the timing at which servo information is read out of a recording medium by a head to carry out servo control.

"INPUT" represents the level (size or amplitude) of a servo information signal input from the head to a read channel at each SGATE timing. "SV AGC OUTPUT" represents the level of a gain signal (gain value) output from an AGC circuit to an amplifier (VGA) at each SGATE timing. "VGA OUTPUT" represents the level of an amplified servo information signal output from the amplifier at each SGATE timing.

As shown in FIG. 9, according to gain adjustment by conventional AGC, the AGC circuit loads a preset initial value or the last gain value (i.e., gain value converged in the last period) at the startup of SGATE to follow a change in "INPUT".

The AGC circuit thus outputs a gain ("SV AGC OUTPUT") following a change in "INPUT", to the amplifier. As a result, "VGA OUTPUT" becomes constant as it approaches the latter half of SGATE.

Recently, for such a storage device, a technique of carrying out RRO (Repeatable Run-Out) correction using RRO information in servo control is adopted. Specifically, a postcode area is provided immediately after a servo area to record premeasured RRO information in the postcode area.

On data reproduction, RRO information is reproduced following the reproduction of servo information to carry out RRO correction using RRO information in servo control. This improves the on-track accuracy of a head.

When gain adjustment by AGC including RRO is carried out, to deal with data reproduction in the postcode area following the servo area, a method of keeping a change-following gain in the servo area and carrying out only the sample timing phase correction in the post code area to detect data is generally adopted. FIG. 10 is a timing chart for explaining response waveforms generated by conventional AGC including RRO. In FIG. 10, "SGATE" is the same as "SGATE" of FIG. 9.

"RROGATE", on the other hand, represents the timing at which RRO information is read out of a recording medium by a head to carry out RRO correction. "INPUT" represents the levels (size or amplitude) of a servo information signal and an RRO information signal that are input from the head to a read channel at each SGATE timing and RROGATE timing.

"SV AGC OUTPUT" represents the level of a gain output from an AGC circuit to an amplifier at each SGATE timing and RROGATE timing. "VGA OUTPUT" represents the levels of an amplified servo information signal and an amplified RRO information signal that are output from the amplifier at each SGATE timing and RROGATE timing.

As shown in FIG. 10, according to gain adjustment by conventional AGC including RRO, the AGC circuit keeps a gain adopted in the servo area to output the gain to the amplifier at each RROGATE timing.

The above gain adjustment by AGC including conventional RRO, however, poses a problem of incapable of dealing with a change in a signal level in the postcode area.

Specifically, in the post code area, RRO information is measured as a magnetic head is kept on a track of a disc using the servo area already filled in with servo information, and the measured RRO information is written in. Because of this, the RRO information turns out to be different in recording condition (recording level) from the servo information.

As a result, as shown in FIG. 10, input of servo information and RRO information may become different in signal level from each other. In gain adjustment by AGC including conventional RRO, however, the AGC circuit keeps a gain adopted in the servo area at each RROGATE timing.

As a result, as shown in "VGA OUTPUT" in FIG. 10, the level of the amplified servo information signal becomes constant while the level of the amplified RRO information signal becomes not constant. This means that the conventional technique is incapable of dealing with a signal level change in the postcode area, which consequently leads to an inferior data detection rate.

In the postcode area, a preamble portion for taking in a gain or sample timing is reduced to improve recording density. This makes impossible ensuring a sufficient time for a gain to follow a change through a feedback loop. Such a circumstance also constitutes the cause of the inferior data detection rate.

There is the inferior data detection rate not only in the storage device having the post code area and the servo area, but also in such a storage device that following reproduction of first information, reproduces second information from a second area that is adjacent to a certain first area and that has the second information recorded at a recording level different from the recording level of the first information.

SUMMARY

It is an object of the present invention to at least partially solve the problems in the conventional technology.

According to an aspect of an embodiment, a storage device includes a recording unit on which servo information is recorded in each of a plurality of servo areas while postcode information is recorded in each of postcode areas adjacent to the servo areas. The postcode information is recorded at a recording level different from a recording level of the servo information; a reading unit that reads servo information and postcode information recorded on the recording unit to acquire a servo signal and a postcode signal. The storage device also includes an amplifying unit that amplifies the servo signal according to a first gain value and amplifies the postcode signal according to a second gain value; a first gain value output unit that when the servo signal is amplified, outputs the first gain value following a change in the servo signal, to the amplifying unit so that a level of the amplified signal becomes constant; and a second gain value output unit that when the postcode signal is amplified, outputs the second gain value following a change in the first gain value output from the first gain value output unit, to the amplifying unit so that a level of the amplified signal becomes constant.

According to another aspect of an embodiment, a gain adjusting device outputs a gain value to an amplifier that amplifies, according to a first gain value, a first input signal acquired by reproducing first information from a plurality of first areas having the first information recorded therein area by area in order, the amplifier amplifying, according to a second gain value, a second input signal acquired by reproducing second information pursuant to reproduction of the first information, from a second area that is adjacent to the first area and that has the second information recorded at a recording level different from that of the first information. The gain adjusting device includes a first gain value output unit that when the first input signal is amplified, outputs the first gain value following a change in the first input signal, to the amplifier so that a level of the amplified signal becomes constant; and a second gain value output unit that when the second input signal is amplified, outputs the second gain value following a change in the first gain value output from the first gain value output unit, to the amplifier so that a level of the amplified signal becomes constant.

According to still another aspect of an embodiment, a computer program product has a computer readable medium including programmed instructions for outputting a gain value to an amplifier that amplifies, according to a first gain value, a first input signal acquired by reproducing first information from a plurality of first areas having the first information recorded therein area by area in order, the amplifier amplifying, according to a second gain value, a second input signal acquired by reproducing second information pursuant to reproduction of the first information, from a second area that is adjacent to the first area and that has the second information recorded at a recording level different from that of the first information. The instructions, when executed by a computer, cause the computer to perform when the first input signal is amplified, calculating the first gain value following a change in the first input signal so that a level of the amplified signal becomes constant; and when the second input signal is amplified, calculating the second gain value following a change in the first gain value output from the first gain value output unit so that a level of the amplified signal becomes constant.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Embodiments of a gain adjusting device, a gain adjusting program, and a storage device according to the present invention will now be described with reference to the accompanying drawings. In the following embodiments, a case of applying the present invention to such a disc device as magnetic disc device will be described.

Figure 1:
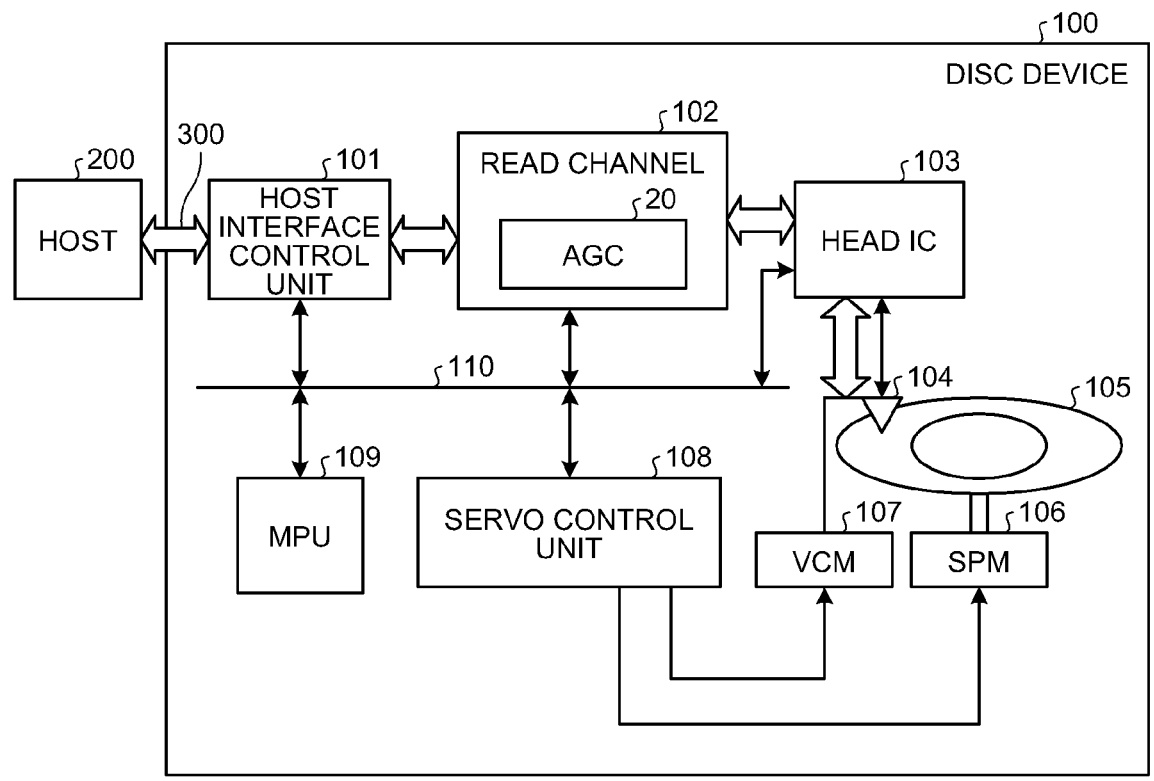
FIG. 1 is a function block diagram of a configuration of a disc device according to a first embodiment.

A configuration of a disc device according to a first embodiment will first be described. FIG. 1 is a function block diagram of a configuration of the disc device according to the first embodiment.

As shown in FIG. 1, the disc device 100 is connected to a host 200 (superior apparatus), such as a personal computer, via a host interface 300, which is provided as, for example, a serial ATA interface.

The disc device 100 includes a host interface control unit 101, a read channel 102, a head IC 103, a head 104, a disc medium 105, an SPM (Spindle Motor) 106, a VCM (Voice Coil Motor) 107, a servo control unit 108, and an MPU 109. The host interface control unit 101, the read channel 102, the head IC 103, the servo control unit 108, and the MPU 109 are interconnected via a common bus 110.

The host interface control unit 101 controls input/output of data that is exchanged between the host 200 and the disc device 100 via the host interface 300. Data transferred from the host 200 through the host interface 300 includes command data on reading/writing from/to the disc medium 105 and data read out of the disc medium 105.

The read channel 102 codes data to be written to the disc medium 105 to transfer the coded data to the head IC 103 in executing writing-in operation, while decodes data read out of the disc medium 105 in executing read-in operation. In addition, the read channel 102 demodulates a servo information signal and an RRO (Repeatable Run-Out) information signal read out of the disc medium 105 to transfer the demodulated information signals to the servo control unit 108 in executing writing-in operation and read-in operation.

The read channel 102 has an AGC 20 that carries out auto gain control (hereinafter abbreviated to "AGC"). The detail of the read channel 102 will be described later with reference to FIG. 2.

The head IC 103 writes data to be written to the disc medium 105 to the disc medium 105 as a current change via the head 104 in executing writing-in operation. In executing read-in operation, the head IC 103 amplifies data read by the head 104 out of the disc medium 105 to transfer the amplified data to the read channel 102.

In executing writing-in operation and read-in operation, the head IC 103 amplifies a servo information signal and an RRO information signal read by the head 104 out of the disc medium 105 to transfer the amplified information signals to the read channel 102.

The disc medium 105 has recorded thereon writing-in data, etc., sent from the host 200. On the disc medium 105, servo information is recorded in each of a plurality of servo areas and RRO information (postcode information) is recorded in each of postcode areas adjacent to the servo areas at a recording level different from the recording level of the servo information.

RRO information (RRO data) is the information that indicates a repeatable position error component occurring at the time of positioning a magnetic head. On the disc medium 105, servo data and RRO data are recorded as magnetic patterns with a constant period that extend radially from the rotation center in arcuate shapes. The head 104 writes and reads data to and from the disc medium 105.

The servo control unit 108 controls the operation of the VCM 107 and the SPM 106, using servo information and RRO information. In other words, in servo control by the servo control unit 108, RRO correction using RRO information is carried out to improve the on-track accuracy of the head.

The VCM 107 moves the head to a target position on the disc medium 105, and the SPM 106 rotates the disc medium 105. The MPU 109 carries out overall control over the disc device 100 by reading a control program out of a nonvolatile memory, etc., and executing the program.

Figure 2:
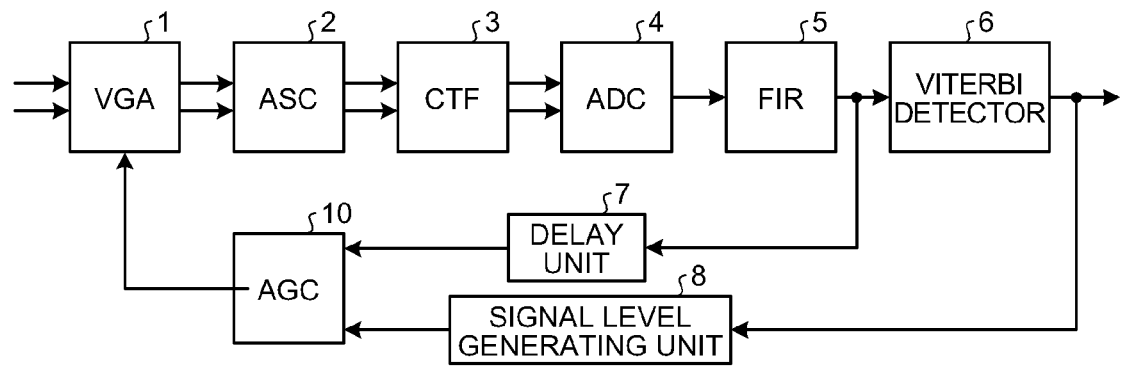
FIG. 2 is a general configuration diagram of an example of a loop configuration of an AGC circuit.

The detail of the read channel 102 of FIG. 1 will then be described. FIG. 2 is a diagram of a loop configuration of the AGC circuit incorporated in the read channel 102.

As shown in FIG. 2, the loop configuration of the AGC circuit includes a VGA (Variable Gain Amplifier) 1, an ASC (Asymmetric Collection) unit 2, a CTF (Continuous Time Filter) 3, an ADC (Analog Digital Converter) 4, an FIR 5, a Viterbi detector 6, a delay unit 7, a signal level generating unit 8, and an AGC 10.

The VGA 1 is the amplifier that adjusts a gain to the level of data transferred from the head IC 103 and to the levels of a servo information signal and an RRO information signal. Specifically, the VGA 1 amplifies a servo information signal and an RRO information signal according to a gain value input from the AGC 10 so that the levels (amplitude) of the amplified servo information signal and the RRO information signal become constant.

The ASC unit 2 amends the asymmetry of the amplitude of an analog signal that is adjusted in gain by the VGA 1. The CTF 3 equalizes the waveform of the analog signal whose asymmetric amplitude is amended by the ASC unit 2 and eliminates a high-frequency signal component from the analog signal. The ADC 4 converts the analog signal whose waveform is equalized and high-frequency component is eliminated by the CTF 3, into a digital signal.

The FIR 5 filters an input signal to equalize its waveform. The Viterbi detector 6 detects a servo sink mark (which is information indicative of the start position of servo data) in a servo data signal whose waveform is equalized by the CTF and the FIR, using the Viterbi decoding method. The delay unit 7 delays a signal input from the FIR 5 to output the delayed signal as a measurement to the AGC 10. The signal level generating unit 8 outputs a signal input from the Viterbi detector 6, to the AGC 10 as a target value.

The AGC 10 outputs a gain value to the VGA 1 according to a measurement input from the delay unit 7 and a target value input from the signal level generating unit 8. Specifically, when a servo information signal is amplified, the AGC 10 outputs a gain value (first gain value) following a change in the servo information signal, to the VGA 1 so that the level of the amplified signal becomes constant.

When an RRO information signal is amplified, the AGC 10 outputs a gain value (second gain value) following a change in the first gain value, to the VGA 1 so that the level of the amplified signal becomes constant. The detail of the AGC 10 will be described later with reference to FIG. 3.

Figure 3:
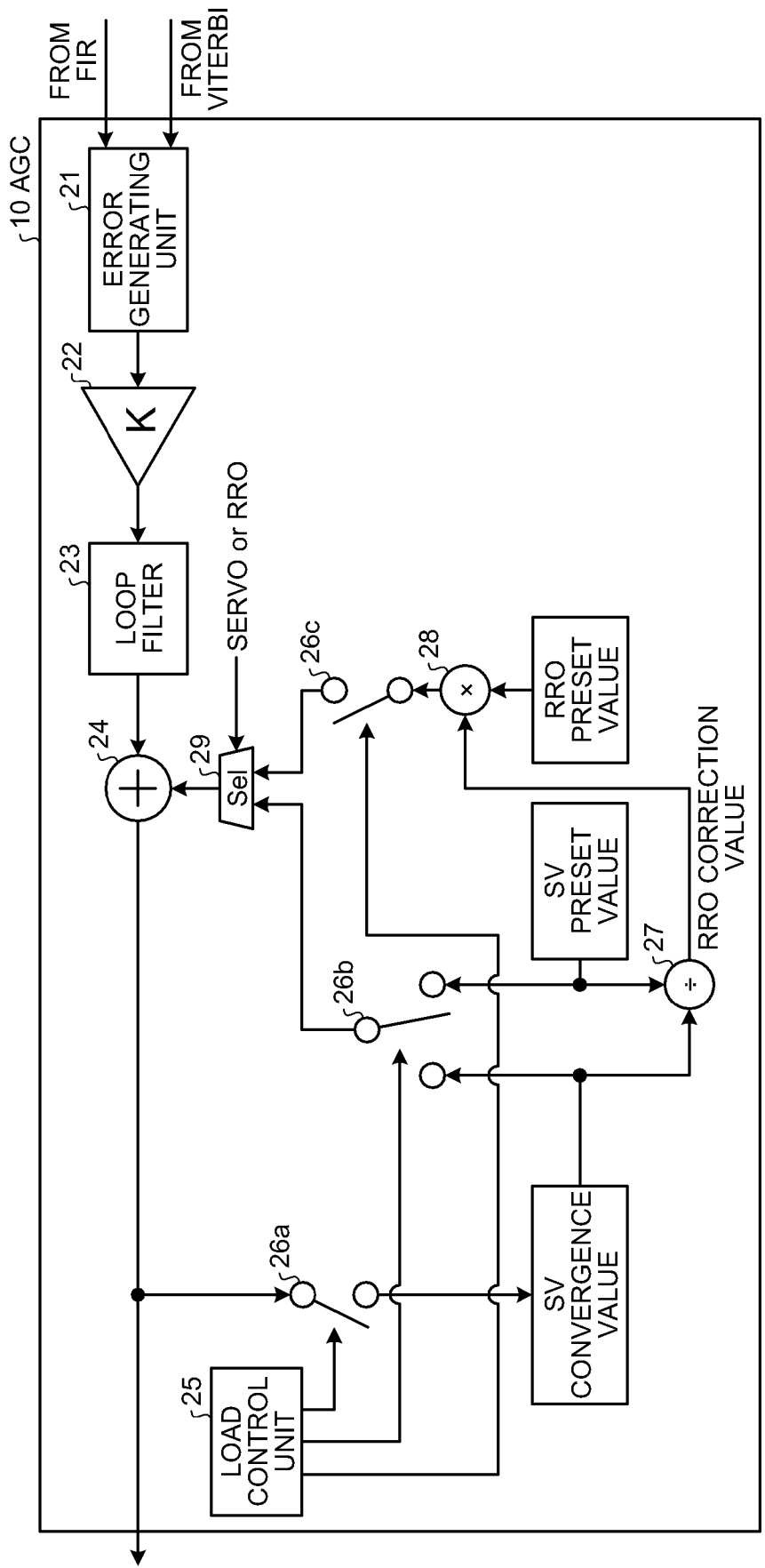
FIG. 3 is a function block diagram of an internal configuration of an AGC according to the first embodiment.

The detail of the AGC 10 of FIG. 2 will then be described. FIG. 3 is a function block diagram of an internal configuration of the AGC according to the first embodiment.

As shown in FIG. 3, the AGC 10 includes an error generating unit 21, a gain adjuster K 22, a loop filter 23, an adding unit 24, a load control unit 25, select switches 26a, 26b, and 26c, a dividing unit 27, a multiplying unit 28, and a selector 29. The AGC 10 stores therein an SV convergence value, an SV preset value, and an RRO preset value.

The error generating unit 21 generates an error signal out of a measurement input from the FIR 5 and a target value input from the Viterbi detector 6. The gain adjuster K 22 adjusts a gain to the error signal. The loop filter 23 eliminates noises from the error signal.

The load control unit 25 operates the select switches 26a, 26b, and 26c. Specifically, when data reading in the SV area is over, the load control unit 25 operates the select switch 26a to keep a gain output from the AGC 10 to the VGC 1 at the point of end of the data reading as the SV convergence value.

At the first SGATE timing, the load control unit 25 operates the select switch 26b to load an SV initial gain ($G_{SV\text{-}preset}$). At each SGATE timing ensuing the first SGATE timing, the load control unit 25 also operates the select switch 26b to load the SV convergence value ($G_{SV\text{-}converge}$). When RROGATE turns on, the load control unit 25 operates the select switch 26c to load an RRO gain value, which will be described later.

The dividing unit 27 divides the SV initial gain by the SV convergence value to determine an RRO correction value. The multiplying unit 28 multiplies the RRO correction value by an RRO initial gain ($G_{RRO\text{-}preset}$) to determine the RRO gain value. The RRO gain value is, therefore, calculated from the following equation.

$$G_{RRO}(n) = G_{RRO-preset} \times \left( \frac{G_{SV-preset}}{G_{SV-converge}(n)} \right) \tag{1}$$

The selector 29 outputs the SV initial gain ($G_{SV\text{-}preset}$) or the SV convergence value ($G_{SV\text{-}converge}$) to the adding unit 24 during data reading in the servo area, and outputs the RRO gain value input from the select switch 26c, to the adding unit 24 during data reading in the RRO area.

During data reading in the servo area, the adding unit 24 outputs a gain value determined by adding an error signal to the SV initial gain ($G_{SV\text{-}preset}$) or the SV convergence value ($G_{SV\text{-}converge}$), to the VGA 1. During data reading in the RRO area, the adding unit 24 outputs a gain value determined by adding the error signal to the RRO gain value, to the VGA 1.

Figure 4:
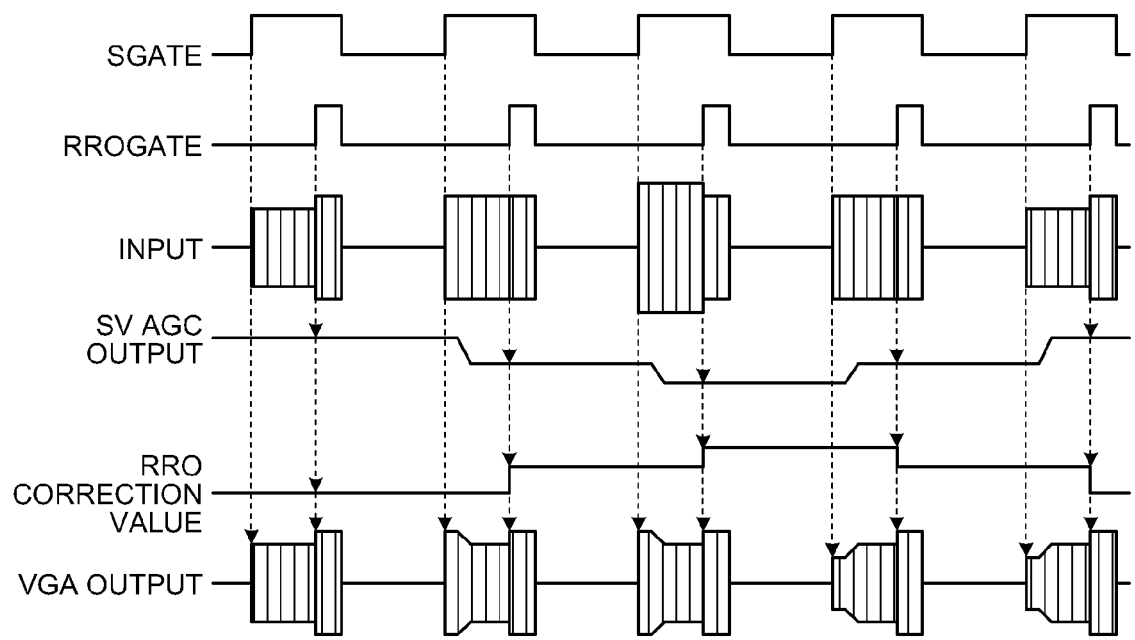
FIG. 4 is a timing chart of response waveforms generated by the AGC.

An example of a gain adjustment process of the first embodiment will then be described. FIG. 4 is a timing chart of response waveforms generated by the AGC 10.

In FIG. 4, "SGATE" represents the timing at which servo information is read out of the disc medium 105 by the head 104 to carry out servo control. "RROGATE" represents the timing at which RRO information is read out of the disc medium 105 by the head 104 to carry out RRO correction.

"INPUT" represents the levels (size or amplitude) of a servo information signal and an LLO information signal that are input from the head 104 to the VGA 1 at each SGATE timing and RROGATE timing.

"SV AGC OUTPUT" represents the level of a gain (gain value) output from the AGC 10 to the VGA 1 at each SGATE timing and RROGATE timing. "RRO CORRECTION VALUE" represents the level of an RRO correction value determined by the dividing unit 27. "VGA OUTPUT" represents the levels of an amplified servo information signal and an amplified RRO information signal that are output from the amplifier at each SGATE timing and RROGATE timing.

As shown in FIG. 4, the RRO correction value follows a change in a gain (gain value) that is output to the VGA 1 at each SGATE timing. In other words, at each RROGATE timing, an SV convergence value ($G_{SV\text{-}converge}$) is not directly output to the VGA 1, but an RRO gain value calculated by multiplying the RRO correction value by an SV initial gain ($G_{SV\text{-}preset}$) is output to the VGA 1. As a result, as shown in FIG. 4, the level of the amplified RRO information signal output from the VGA 1 becomes constant at each PROGATE timing.

Figure 5:
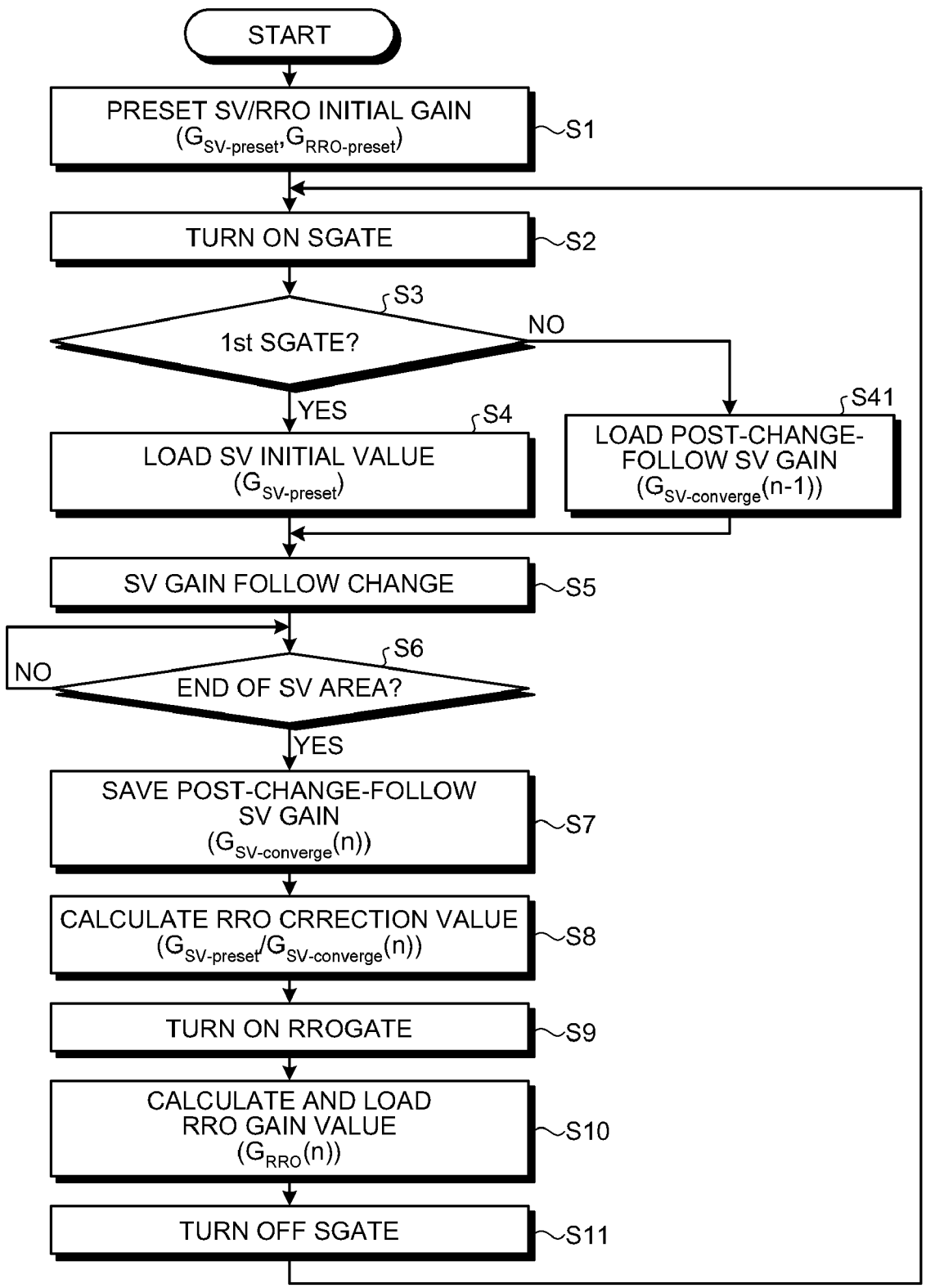
FIG. 5 is a flowchart of a gain adjustment procedure by the AGC.

A procedure of gain adjustment of the first embodiment will then be described. FIG. 5 is a flowchart of a gain adjustment procedure by the AGC.

As shown in FIG. 5, the AGC 10 presets an SV initial gain ($G_{SV\text{-}preset}$) and an RRO initial gain ($G_{RRO\text{-}preset}$) as an SV preset value and an RRO preset value, respectively (Step S1).

At timing at which SGATE turns on and the head 104 reads servo information out of the disc medium 105 (Step S2), the AGC 10 determines whether the SGATE timing is the initial timing (Step S3).

When the SGATE timing is the initial timing (Yes at Step S3), the AGC 10 loads the SV initial gain ($G_{SV\text{-}preset}$) (Step S4), and causes an SV gain to follow a change based on the loaded SV initial gain until the SV area ends (Steps S5 and S6).

When the SGATE timing is not the initial timing (No at Step S3), the AGC 10 loads an SV convergence value ($G_{SV\text{-}converge}$) (Step S41), and causes the SV gain to follow a change based on the loaded SV convergence value ($G_{SV\text{-}converge}$) until the SV area ends (Steps S5 and S6). When the SV area ends (Yes at Step S6), the AGC 10 keeps a gain at the point of end of the SV area as an SV convergence value (Step S7).

Subsequently, the AGC 10 calculates an RRO correction value (Step S8), that is, divides the SV initial gain by the SV convergence value to determine the RRO correction value. At timing at which RROGATE turns on and the head 104 reads RRO information out of the disc medium 105 (Step S9), the AGC 10 calculates and loads an RRO gain value, and outputs the RRO gain value to the VGA 1 until SGATE turns off (Steps S10 and S11).

Specifically, the AGC 10 outputs the RRO gain value calculated by multiplying the RRO correction value by the RRO initial gain ($G_{RRO\text{-}preset}$), to the VGA 1. When SGATE turns on (step S2), the AGC 10 then repeats the above process.

As described above, according to the first embodiment, when a servo information signal is amplified, a gain value (first gain value) following a change in the servo information signal is output to the VGA 1 so that the level of the amplified signal becomes constant. When an RRO information signal is amplified, a gain value (second gain value) following a change in the first gain value is output to the VGA 1 so that the level of the amplified signal becomes constant. This enables accurately following a gain change in the servo area and in the postcode area.

According to the first embodiment, when an RRO information signal is amplified, the SV initial gain is divided by the SV convergence value to determine the RRO correction value, and the RRO gain value calculated by multiplying the RRO correction value by the RRO initial gain ($G_{RRO\text{-}preset}$) is output to the VGA 1. This enables following a gain change of an RRO information signal using a simple circuit configuration in auto gain control on a disc medium on which the recording level of servo information and that of RRO information are different but the recording level of each piece of RRO information is constant.

The first embodiment is described as a case of applying the present invention to the disc medium on which the recording level of servo information and that of RRO information are different but the recording level of each piece of RRO information is constant. The present invention is, however, not limited to this case, but may be applied to a disc medium on which the recording level of each piece of RRO information is not constant. A second embodiment will be described as a case of applying the present invention to the disc medium on which the recording level of each piece of RRO information is not constant.

Figure 6:
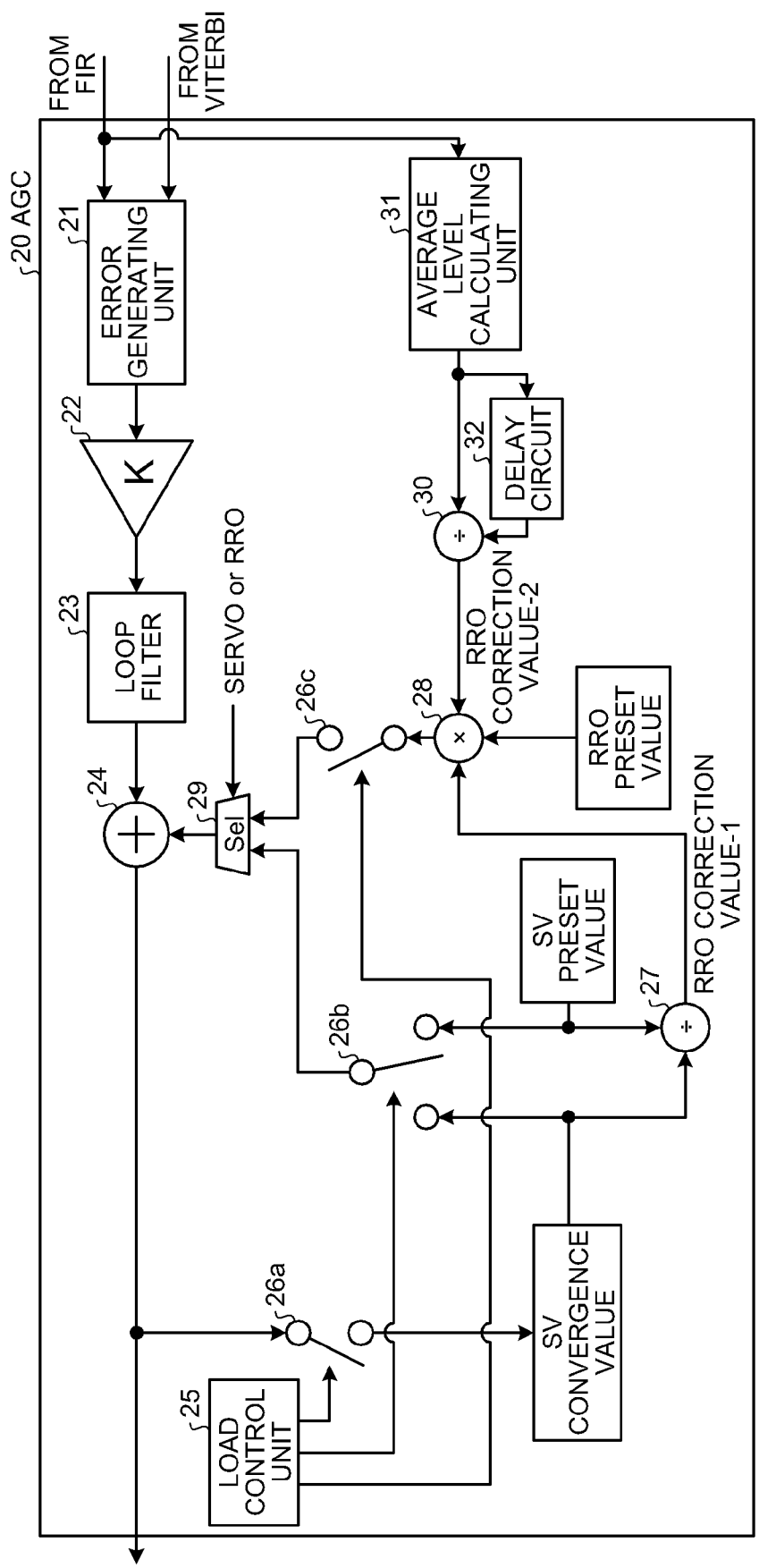
FIG. 6 is a function block diagram of an internal configuration of an AGC according to a second embodiment.

FIG. 6 is a function block diagram of an internal configuration of an AGC according to the second embodiment. As shown in FIG. 6, the AGC 20 of the second embodiment includes the error generating unit 21, the gain adjuster K 22, the loop filter 23, the adding unit 24, the load control unit 25, the select switches 26a, 26b, and 26c, the dividing unit 27, the multiplying unit 28, the selector 29, a dividing unit 30, an average level calculating unit 31, and a delay circuit 32. The AGC 20 has stored therein an SV convergence value, an SV preset value, and an RRO preset value.

The error generating unit 21, the gain adjuster K 22, the loop filter 23, the adding unit 24, the load control unit 25, the select switches 26a, 26b, and 26c, the dividing unit 27, the multiplying unit 28, and the selector 29 are the same components as described in the first embodiment. The average level calculating unit 31 calculates the average of measurements (amplified RRO information signals) input from the FIR 5.

An average that is calculated at "timing n–1" preceding one period of timing to "timing n" in RROGATE is expressed as "$G_{RRO\text{-}avg}(n-1)$", and an average that is calculated at "timing n–2" preceding one period of timing to "timing n–1" is expressed as "$G_{RRO\text{-}avg}(n-2)$".

The delay circuit 32 delays an average calculated by the average level calculating unit 31. This means that when the average level calculating unit 31 calculates the average "$G_{RRO\text{-}avg}(n-1)$", the delay circuit 32 holds the average "$G_{RRO\text{-}avg}(n-2)$". At RROGATE "timing n", the dividing unit 30 divides the average "$G_{RRO\text{-}avg}(n-2)$" input from the average level calculating unit 31 by the average "$G_{RRO\text{-}avg}(n-1)$" input from the delay circuit 32 to determine "RRO CORRECTION VALUE-2". In the second embodiment, an RRO correction value determined by the dividing unit 27 is expressed as "RRO CORRECTION VALUE-1".

In the second embodiment, the amplifying unit 28 multiplies an RRO initial gain ($G_{RRO\text{-}preset}$) by "RRO CORRECTION VALUE-1" and "RRO CORRECTION VALUE-2" to determine an RRO gain value. Thus, the RRO gain value is calculated from the following equation.

$$G_{RRO}(n) = G_{RRO-preset} \times \left( \frac{G_{SV-preset}}{G_{SV-converge}(n)} \right) \times \left( \frac{G_{PRO-avg}(n-2)}{G_{PRO-avg}(n-1)} \right) \quad (2)$$

Figure 7:
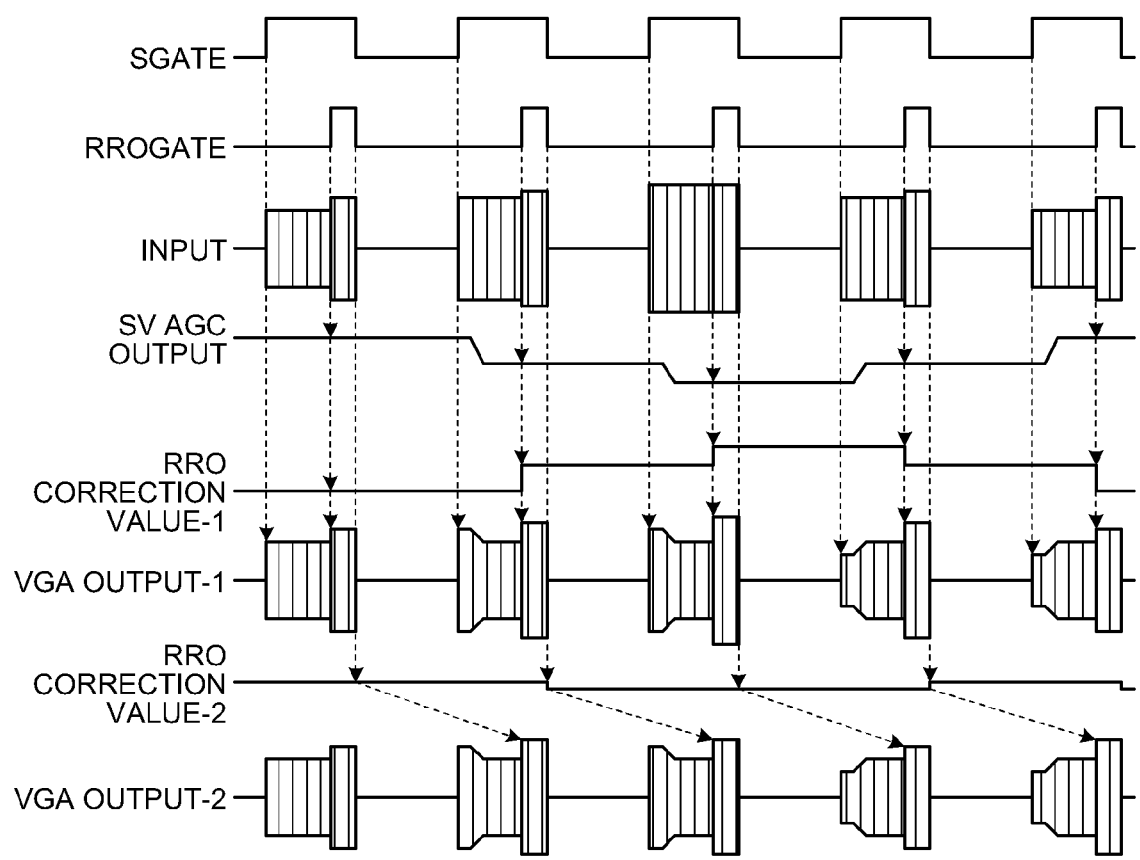
FIG. 7 is a timing chart of response waveforms generated by the AGC.

An example of a gain adjustment process of the second embodiment will then be described. FIG. 7 is a timing chart of response waveforms generated by the AGC 20.

In FIG. 7, "SGATE" and "RROGATE" are the same as those shown in FIG. 4. "INPUT" is also the same as that shown in FIG. 4, except that the input level of each piece of RRO information is not constant. "SV AGC OUTPUT" represents the level of a gain (gain value) output from the AGC 10 to the VGA 1 at each SGATE timing and RROGATE timing. "RRO CORRECTION VALUE-1" represents the level of an RRO correction value determined by the dividing unit 27.

"RRO CORRECTION VALUE-2" represents the level of an RRO correction value determined by the dividing unit 30. "VGA OUTPUT-1" and "VGA OUTPUT-2" represent the levels of an amplified servo information signal and an amplified RRO information signal that are output from the amplifier at each SGATE timing and RROGATE timing.

Specifically, "VGA OUTPUT-2" represents the VGA output that results when both "RRO CORRECTION VALUE-1" and "RRO CORRECTION VALUE-2" are used, while "VGA OUTPUT-1" represents, in comparison, the VGA output that results when only the "RRO CORRECTION VALUE-1" is used.

As shown in FIG. 7, "RRO CORRECTION VALUE-2" follows a change in a gain (gain value) output to the VGA 1 at each RROGATE timing. This means that not an RRO gain value calculated by multiplying an RRO initial gain ($G_{RRO-preset}$) by "RRO CORRECTION VALUE-1" but an RRO gain value calculated by multiplying the RRO gain value multiplied by "RRO CORRECTION VALUE-1" further by "RRO CORRECTION VALUE-2" is output to the VGA 1 at each RROGATE timing.

As a result, as shown in FIG. 7, the level of the amplified RRO information signal output from the VGA 1 become more constant in "VGA OUTPUT-1" than in "VGA OUTPUT-2" at each RROGATE timing.

Figure 8:
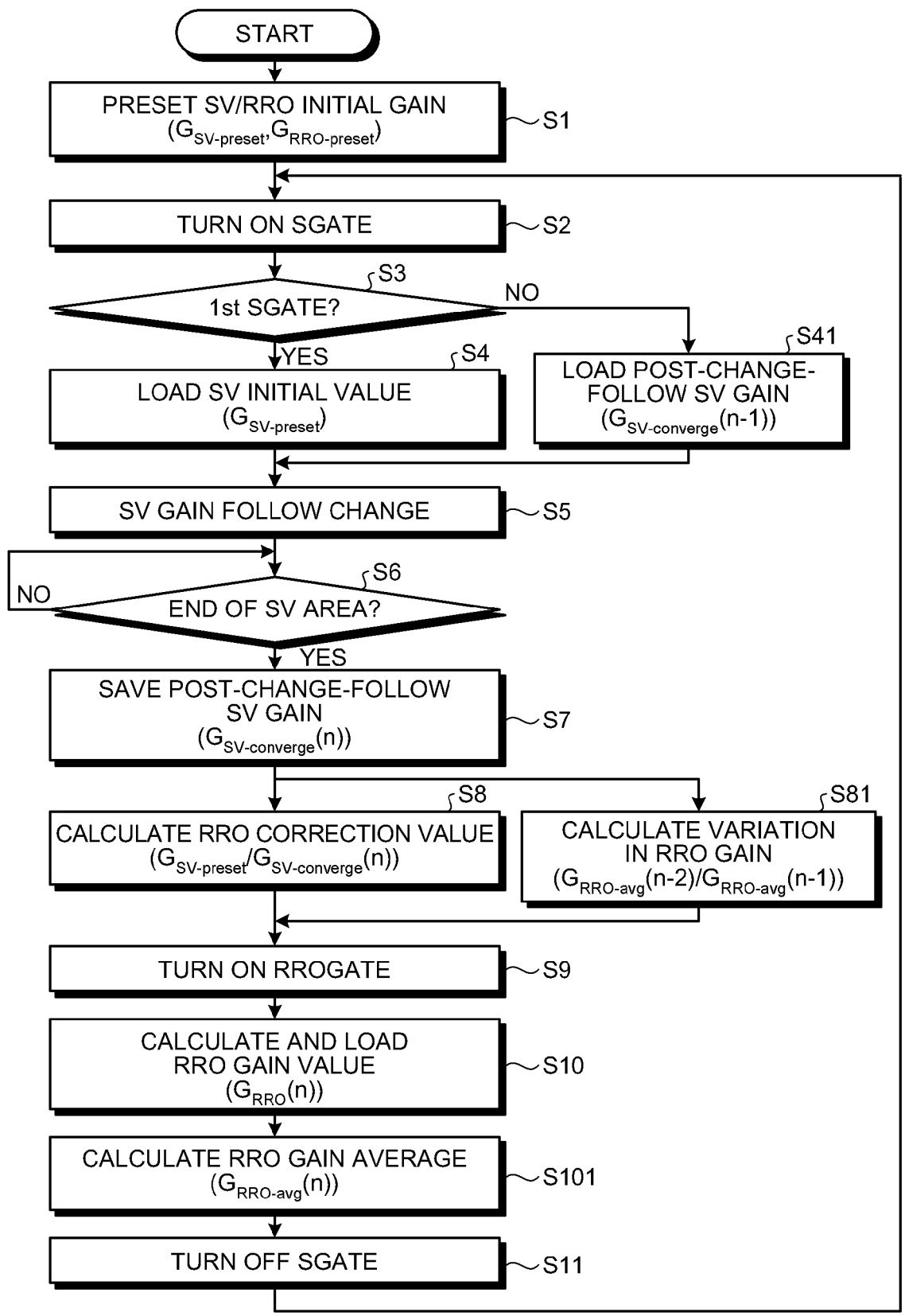
FIG. 8 is a flowchart of a gain adjustment procedure by the AGC.
Figure 9:
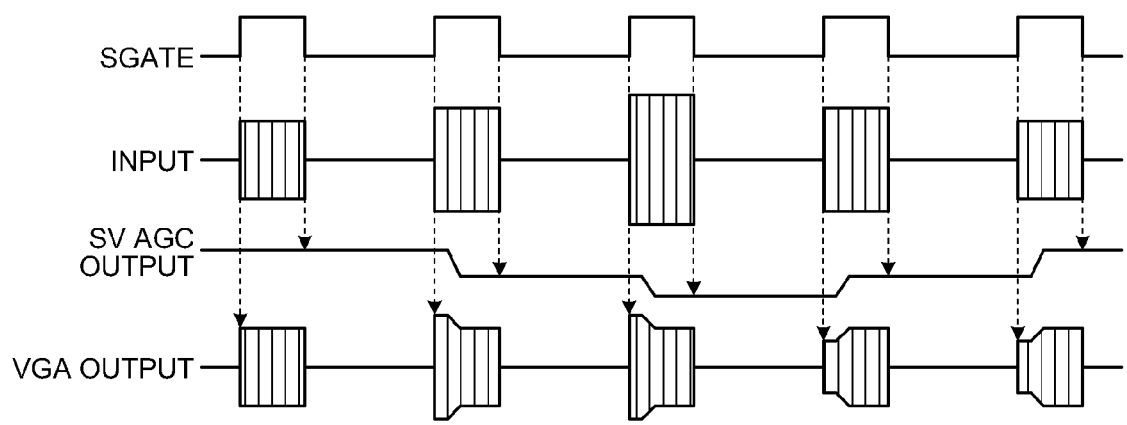
FIG. 9 is a timing chart for explaining response waveforms generated by conventional AGC.
Figure 10:
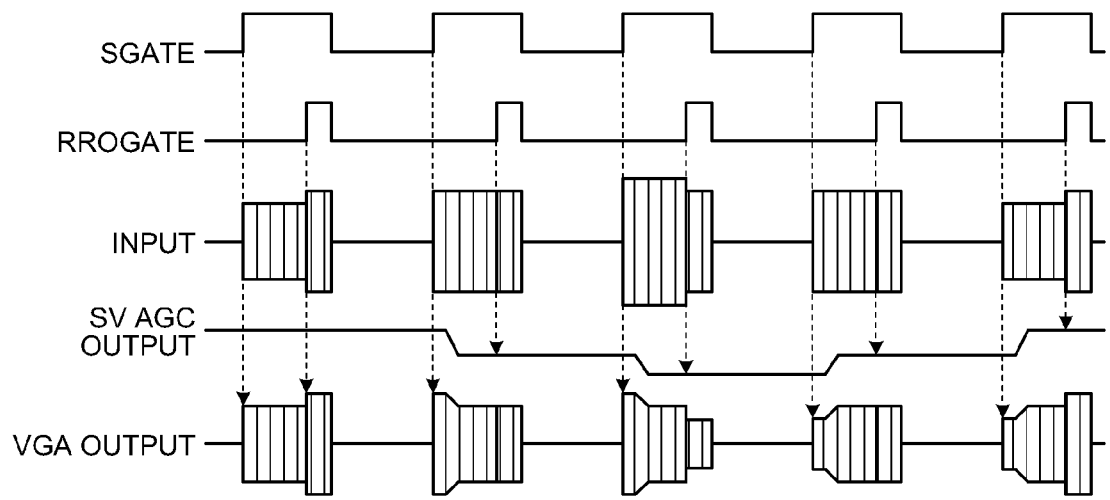
FIG. 10 is a timing chart for explaining response waveforms generated by AGC including conventional RRO.

A procedure of gain adjustment of the second embodiment will then be described. FIG. 8 is a flowchart of a gain adjustment procedure by the AGC. The steps at which the same processes as described in the first embodiment are carried out are denoted by the same reference numerals.

As shown in FIG. 8, the AGC 20 presets an SV initial gain ($G_{SV-preset}$) and an RRO initial gain ($G_{RRO-preset}$) as an SV preset value and an RRO preset value, respectively (Step S1). Then, at timing at which SGATE turns on and the head 104 reads servo information out of the disc medium 105 (Step S2), the AGC 20 determines whether the SGATE timing is the initial timing (Step S3).

When the SGATE timing is the initial timing (Yes at Step S3), the AGC 20 loads the SV initial gain ($G_{SV-preset}$) (Step S4), and causes an SV gain to follow a change based on the loaded SV initial gain until the SV area ends (Steps S5 and S6).

When the SGATE timing is not the initial timing (No at Step S3), the AGC 20 loads an SV convergence value ($G_{SV-converge}$) (Step S41), and causes the SV gain to follow a change based on the loaded SV convergence value ($G_{SV-converge}$) until the SV area ends (Steps S5 and S6). When the SV area ends (Yes at Step S6), the AGC 20 keeps a gain at the point of end of the SV area as an SV convergence value (Step S7).

Subsequently, the AGC 20 calculates RRO correction values (Steps S8 and S81), that is, divides the SV initial gain by the SV convergence value to determine "RRO CORRECTION VALUE-1" and also divides an average "$G_{RRO-avg}$(n−2)" by and an average "$G_{RRO-avg}$(n−1)" to determine "RRO CORRECTION VALUE-2".

At timing at which RROGATE turns on and the head 104 reads RRO information out of the disc medium 105 (Step S9), the AGC 20 calculates and loads an RRO gain value, and outputs the RRO gain value to the VGA 1 until SGATE turns off (Steps S10 and S11).

Specifically, the AGC 20 outputs the RRO gain value calculated by multiplying the RRO initial gain ($G_{RRO-preset}$) by "RRO CORRECTION VALUE-1" and "RRO CORRECTION VALUE-2", to the VGA 1.

The AGC 20 monitors measurements (amplified RRO information signals) input from the FIR 5 until SGATE turns off to calculate the average of RRO information signals "$G_{RRO-avg}$(n)" (Steps S101 and S11). Subsequently, when SGATE turns on (Step S2), the AGC 20 then repeats the above processes.

As described above, according to the second embodiment, when an RRO information signal is amplified, the SV initial gain is divided by the SV convergence value to determine "RRO CORRECTION VALUE-1" and the average "$G_{RRO-avg}$(n−2)" is divided by the average "$G_{RRO-avg}$(n−1)" to determine "RRO CORRECTION VALUE-2".

Then, the RRO gain value calculated by multiplying the RRO initial gain ($G_{RRO-preset}$) by "RRO CORRECTION VALUE-1" and "RRO CORRECTION VALUE-2" is output to the VGA 1. This enables following a gain change of an RRO information signal in auto gain control on a disc medium on which the recording level of each piece of RRO information is not constant.

The first and second embodiments relate to a case of applying the present invention to a magnetic disc as the storage medium and to a magnetic disc device as the storage device. The present invention is, however, not limited to this case. The present invention may be applied to other storage media and disc devices, such as an optical disc, optical disc device, photomagnetic disc, and photomagnetic disc device.

Application of the present invention is not limited to such a storage device. The present invention may also be applied to a storage device that following reproduction of first information, reproduces second information from a second area that is adjacent to a certain first area and that has the second information recorded at a recording level different from the recording level of the first information.

The gain adjusting method described in the first and second embodiments is achieved by executing a prepared program on a computer, such as a microcomputer and MPU. This program may be distributed via a network, such as the Internet.

The program may be executed in such a way that the program is recorded on a computer-readable recording medium, such as a hard disc, flexible disc (FD), CD-ROM, MO, and DVD, and is read by a computer out of the recording medium to execute the program.

When information is reproduced in two areas having different input levels, a change in an input level in each area may be followed.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A gain adjusting device that outputs a gain value to an amplifier that amplifies, according to a first gain value, a first input signal acquired by reproducing first information from a plurality of first areas having the first information recorded therein area by area in order, the amplifier amplifying, according to a second gain value, a second input signal acquired by reproducing second information pursuant to reproduction of the first information, from a second area that is adjacent to the first area and that has the second information recorded at a recording level different from that of the first information, the gain adjusting device comprising:

a first gain value output unit that when the first input signal is amplified, outputs the first gain value following a change in the first input signal, to the amplifier so that a level of the amplified signal becomes constant; and a second gain value output unit that when the second input signal is amplified, outputs the second gain value following a change in the first gain value output from the first gain value output unit, to the amplifier so that a level of the amplified signal becomes constant, wherein the second gain value output unit divides a first initial gain value preset as an initial value of the first gain value by a first gain value actually calculated by a first gain value calculating unit to determine a correction value, and multiplies the correction value by a second initial gain value preset as an initial value of the second gain value to calculate the second gain value to output the calculated second gain value to the amplifier.

2. A gain adjusting device that outputs a gain value to an amplifier that amplifies, according to a first gain value, a first input signal acquired by reproducing first information from a plurality of first areas having the first information recorded therein area by area in order, the amplifier amplifying, according to a second gain value, a second input signal acquired by reproducing second information pursuant to reproduction of the first information, from a second area that is adjacent to the first area and that has the second information recorded at a recording level different from that of the first information, the gain adjusting device comprising:

a first gain value output unit that when the first input signal is amplified, outputs the first gain value following a change in the first input signal, to the amplifier so that a level of the amplified signal becomes constant; and a second gain value output unit that when the second input signal is amplified, outputs the second gain value following a change in the first gain value output from the first gain value output unit, to the amplifier so that a level of the amplified signal becomes constant, wherein the second gain value output unit divides a first initial gain value preset as an initial value of the first gain value by a first gain value actually calculated by the first gain value calculating unit to determine a correction value, divides a second gain value calculated by a second gain value calculating unit in an area preceding two areas to a current area by a second gain value calculated by the second gain value calculating unit in an area preceding one area to the current area to determine a second correction value, and multiplies the first and second correction values by a second initial gain value preset as an initial value of the second gain value to calculate the second gain value to output the calculated second gain value to the amplifier.

* * * * *